(12) United States Patent
Chang (10) Patent No.: US 9,729,602 B2
(45) Date of Patent: *Aug. 8, 2017

(54) AUDIO SIGNAL QUALITY MEASUREMENT IN MOBILE DEVICE

(71) Applicant: INHA-INDUSTRY PARTNERSHIP INSTITUTE, Incheon (KR)

(72) Inventor: Joon-Hyuk Chang, Incheon (KR)

(73) Assignee: INHA-INDUSTRY PARTNERSHIP INSTITUTE, Incheon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/019,408

(22) Filed: Feb. 9, 2016

(65) Prior Publication Data
US 2016/0156692 A1    Jun. 2, 2016

Related U.S. Application Data

(63) Continuation of application No. 13/133,637, filed as application No. PCT/KR2011/000163 on Jan. 11, 2011, now Pat. No. 9,300,694.

(51) Int. Cl.
*H04R 29/00* (2006.01)
*H04L 29/06* (2006.01)

(52) U.S. Cl.
CPC .............. *H04L 65/80* (2013.01); *H04L 65/00* (2013.01); *H04R 29/00* (2013.01); *H04R 29/008* (2013.01)

(58) Field of Classification Search
None
See application file for complete search history.

(56) References Cited

U.S. PATENT DOCUMENTS

| | | |
|---|---|---|
| 6,577,648 B1 | 6/2003 | Raisanen et al. |
| 6,823,302 B1 | 11/2004 | Atkinson et al. |
| 7,606,543 B1 | 10/2009 | Seppanen |
| 8,351,589 B2 | 1/2013 | Acero et al. |
| 2004/0162722 A1 | 8/2004 | Rex et al. |
| 2005/0201414 A1 | 9/2005 | Awais |
| 2005/0228655 A1 | 10/2005 | Cao et al. |
| 2006/0080092 A1 | 4/2006 | Sherman |

(Continued)

FOREIGN PATENT DOCUMENTS

| | | |
|---|---|---|
| JP | H09162864 A | 6/1997 |
| JP | 10164187 A | 6/1998 |

(Continued)

OTHER PUBLICATIONS

IBYS Technologies, IBYS launches new solution for QoE measurement of smartphone end-users, IBYS News, Oct. 8, 2010, accessed on Jun. 8, 2011 via http://www.ibys.com/news_20101007.htm.

(Continued)

*Primary Examiner* — Joseph Saunders, Jr.
*Assistant Examiner* — James Mooney
(74) *Attorney, Agent, or Firm* — Brundidge & Stanger, P.C.

(57) ABSTRACT

Technologies are generally described for a method for measuring a quality of an audio signal in a mobile device. In some examples, the mobile device includes a receiving unit configured to receive an audio signal transmitted from another device; an audio quality measuring unit configured to measure a quality of the received audio signal; and a transmission unit configured to transmit the measured quality of the audio signal to the another device.

20 Claims, 4 Drawing Sheets

(56) References Cited

U.S. PATENT DOCUMENTS

| | | |
|---|---|---|
| 2007/0276670 A1 | 11/2007 | Pearlstein |
| 2008/0065393 A1 | 3/2008 | Kincaid |
| 2010/0087188 A1 | 4/2010 | Griff et al. |
| 2010/0316232 A1 | 12/2010 | Acero et al. |
| 2012/0059491 A1 | 3/2012 | Carroll |

FOREIGN PATENT DOCUMENTS

| | | | |
|---|---|---|---|
| JP | 2003518339 A | 6/2003 | |
| JP | 2003308098 A | 10/2003 | |
| JP | 2004186870 A | 7/2004 | |
| JP | 2005292841 A | 10/2005 | |
| JP | 2006295881 A | 10/2006 | |
| JP | 2006352612 A | 12/2006 | |
| JP | 2007197154 A | 8/2007 | |
| JP | 2008211361 A | 9/2008 | |
| JP | 2008538685 A | 10/2008 | |
| JP | 2010199741 A | 9/2010 | |
| JP | 2010220233 A | 9/2010 | |
| KR | 1020010106412 A | 11/2001 | |
| KR | 1020060045423 A | 5/2006 | |
| KR | 100837262 B1 | 6/2008 | |
| KR | 1020080067854 A | 7/2008 | |

OTHER PUBLICATIONS

Anite, Nemo Handy, Aug. 2008, accessed on Jun. 8, 2011 via http://www.coretechrep.com/documents/nemo_handy_n95_us.pdf.

Kim, Doh-Suk. ANIQUE: An Auditory Model for Single-Ended Speech Quality Estimation. IEEE Transactions on Speech and Audio Processing 13(5-2): 821-831 (Sep. 2005).

Chang, J.H. and Kim, N.S., "Distorted Speech Rejection for Automatic Speech Recognition in Wireless Communication," IEICE Transactions on Information and Systems, vol. E87-D, No. 7, pp. 1978-1981, Jul. 1, 2004.

Kim, Doh-Suk, and Ahmed Tarraf, "Enhanced Perceptual Model for Non-Intrusive Speech Quality Assessment," IEEE (May 2006), 829-32, IEEE Xplore Web.

Pan, Davis, "A Tutorial on MPEG/Audio Compression," IEEE Summer, Jun. 1995, 60-73, Web., Herinafter, "Pan".

Australian Patent Office, International Search Report and Written Opinion for International Patent Application No. PCT/KR2011/00163 mailed Mar. 16, 2011, pp. 1-10, Australia.

AUDIO SIGNAL QUALITY MEASUREMENT IN MOBILE DEVICE

CROSS-REFERENCE TO RELATED APPLICATIONS

This application is a Continuation Application under 35 U.S.C. §120 of U.S. application Ser. No. 13/133,637, filed on Jun. 8, 2011, which is a U.S. National Stage filing under 35 U.S.C. §371 of International Application No. PCT/KR11/00163, filed on Jan. 11, 2011. The disclosures of the U.S. application Ser. No. 13/133,637 and the International Application No. PCT/KR11/00163 are hereby incorporated herein by reference in their entireties.

BACKGROUND

Modern telecommunication networks are becoming more and more complex. Especially, various types of networks such as global system for mobile telecommunications (GSM), code-division multiple access (CDMA), universal mobile telecommunication system (UMTS), and voice over internet protocol (VoIP) are widely used in daily life. Since these networks are highly distributed and are sometimes connected to each other in a telephone call, factors degrading the quality of speech becomes increased, and the measurement of the end-to-end speech quality becomes very difficult. Thus, the reliable estimation of the speech quality over modern telecommunication networks is very important not only for network system design and development but also for a user of a mobile device.

SUMMARY

In an example, a mobile device may include a receiving unit configured to receive an audio signal transmitted from another device; an audio quality measuring unit configured to measure a quality of the received audio signal; and a transmission unit configured to transmit the measured quality of the audio signal to the another device.

In an example, a mobile device may include a transmission unit configured to transmit an audio signal to another device; a receiving unit configured to receive, from the another device, a quality of the audio signal transmitted to and received by the another device; and a display unit configured to display the received quality of the audio signal.

In an example, a mobile device may include a transceiver configured to transmit an audio signal to another device and receive another audio signal from the another device; and an audio quality measuring unit configured to measure a quality of the another audio signal received from the another device. The transceiver is further configured to transmit the measured quality of the another audio signal to the another device, and the transceiver is further configured to receive, from the another device, a quality of the audio signal transmitted to and received by the another device.

In an example, a method performed under control of a mobile device may include transmitting an audio signal to another device; receiving, from the another device, a quality of the audio signal transmitted to and received by the another device; displaying the received quality of the audio signal; receiving another audio signal from the another device; measuring a quality of the another audio signal; and transmitting the measured quality of the another audio signal to the another device.

In an example, there is provided a computer-readable storage medium whose contents, when executed by a processor, cause the processor to: transmit an audio signal to a mobile device; receive, from the mobile device, a quality of the audio signal transmitted to and received by the mobile device; display the received quality of the audio signal; receive another audio signal from the mobile device; measure a quality of the another audio signal; and transmit the measured quality of the another audio signal to the mobile device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to measurement of an audio signal quality in a mobile device.

Briefly stated, technologies are generally described for a mobile device for measuring a quality of an audio signal or displaying a quality of an audio signal. In some examples, the mobile device includes a receiving unit configured to receive an audio signal transmitted from another device; an audio quality measuring unit configured to measure a quality of the received audio signal; and a transmission unit configured to transmit the measured quality of the audio signal to the another device. In some examples, the mobile device includes a transmission unit configured to transmit an audio signal to another device; a receiving unit configured to receive, from the another device, a quality of the audio signal transmitted to and received by the another device; and a display unit configured to display the received quality of the audio signal.

Figure 1:
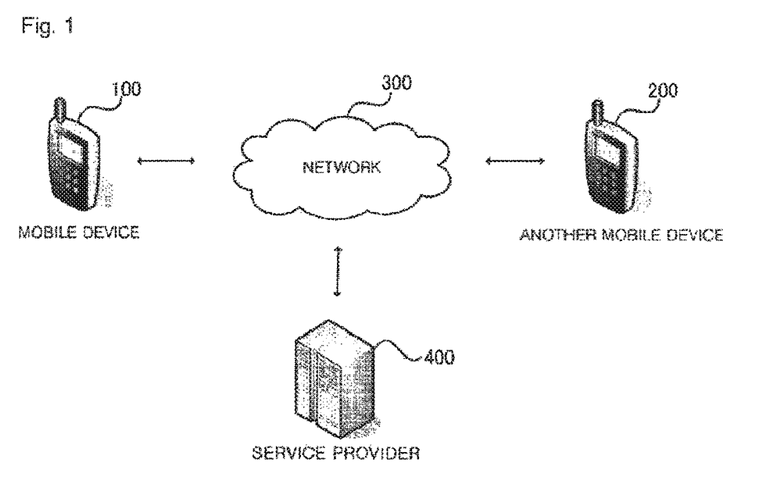
FIG. 1 is a schematic block diagram of an illustrative example of a mobile telecommunication system.

FIG. 1 is a schematic block diagram of an illustrative example of a mobile telecommunication system. Referring to FIG. 1, the mobile telecommunication system may include a mobile device 100, another mobile device 200, a network 300, and a service provider 400.

Mobile device 100 or another mobile device 200 may include all kinds of handheld wireless communication devices such as PCS (Personal Communication System), GSM (Global System for Mobile communications), PDC (Personal Digital Cellular), PHS (Personal Handy-phone System), PDA (Personal Digital Assistant), IMT (International Mobile Telecommunication)-2000, CDMA (Code Division Multiple Access)-2000, W-CDMA (W-Code Division Multiple Access), WiBro (Wireless Broadband Internet), or Mobile WiMAX (Mobile Worldwide Interoperability for Microwave Access) device.

Network 300 may include a wired network such as LAN (Local Area Network), WAN (Wide Area Network), VAN (Value Added Network) or the like, or all kinds of wireless network such as a mobile radio communication network, a satellite network, a bluetooth, WiBro (Wireless Broadband Internet), Mobile WiMAX, HSDPA (High Speed Downlink Packet Access) or the like.

Service provider 400 may be connected with mobile device 100 and another mobile device 200 via network 300 and provide a mobile telecommunication service to mobile device 100 and another mobile device 200. By way of example, but not limitation, service provider 400 may include a base station, a base station controller, an electronic telephone exchanger, an authentication center, a short message service server, and a multimedia message service server.

Mobile device 100 and another mobile device 200 may be connected with each other via network 300, and mobile device 100 and another mobile device 200 may also be connected to service provider 400 via network 300.

Mobile device 100 may receive an audio signal such as a speech signal or a voice signal of a far-end talker from another mobile device 200. Mobile device 100 may measure a quality of the received audio signal and transmit the measured quality of the audio signal back to another mobile device 200.

Meanwhile, another mobile device 200 may receive the measured quality of the audio signal from mobile device 100 and display the received quality of the audio signal.

Figure 2:
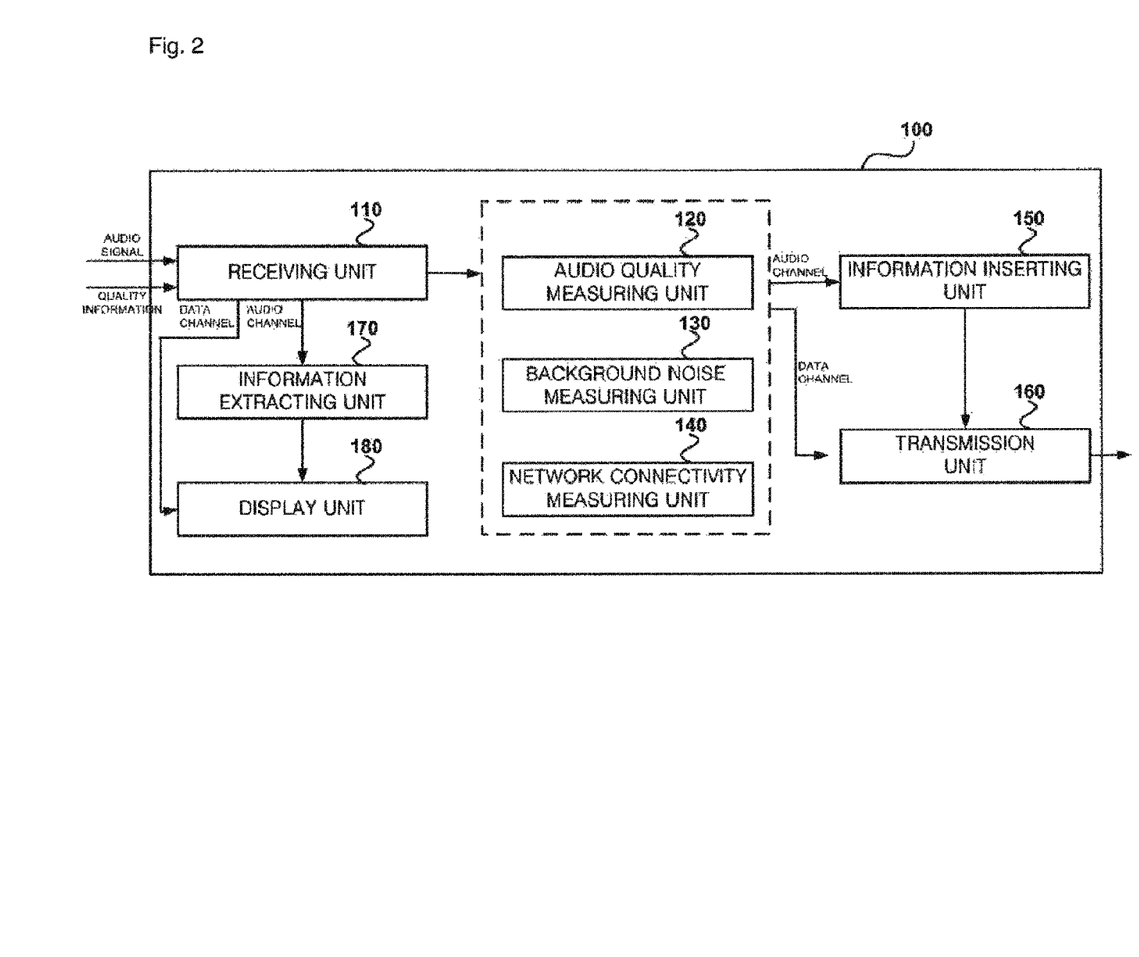
FIG. 2 is a schematic block diagram of an illustrative example of a mobile device illustrated in FIG. 1.

FIG. 2 is a schematic block diagram of an illustrative example of mobile device 100 illustrated in FIG. 1.

Referring to FIG. 2, mobile device 100 may include a receiving unit 110. Receiving unit 110 may receive an audio signal such as speech data of the far-end talker from another mobile device 200. Further, receiving unit 110 may also receive, from another mobile device 200, a quality of an audio signal such as speech data of a near-end talker that was sent to another mobile device 200.

Mobile device 100 may further include an audio quality measuring unit 120. Audio quality measuring unit 120 may measure a quality of the audio signal received by the receiving unit 110. When a call is connected between mobile device 100 and another mobile device 200, receiving unit 110 of mobile device 100 may receive the audio signal of the far-end talker from another mobile device 200. In this case, the received audio signal may be contaminated or damaged by an ambient noise, an echo signal, channel fading, packet loss, network delay or the like and, thus, the near-end talker of mobile device 100 may listen to the contaminated audio signal played through a non-illustrated speaker of mobile device 100.

In order to measure the quality of the audio signal received from another mobile device 200, audio quality measuring unit 120 may use the contaminated audio signal without a reference audio signal or a source audio signal. By way of example, audio quality measuring unit 120 may measure the quality of the audio signal by using an ANIQUE (Auditory Non-Intrusive Quality Estimation) algorithm. In the ANIQUE algorithm, the quality of the audio signal is measured based on functional roles of human auditory systems without using a reference speech signal or a source speech signal.

By way of example, audio quality measuring unit 120 may measure the quality of the audio signal heard by the near-end talker as QoS information represented by a few bits. If the score of the QoS information is scaled from 1 to 4, the QoS information may be represented by 2 bits. If the score of the QoS information is scaled from 1 to 8, the QoS information may be represented by 3 bits. By way of example, the score of the QoS information may be expressed as a Mean Opinion Score (MOS).

As for a timing of measurement, audio quality measuring unit 120 may measure the quality of the audio signal before the audio signal is played through the speaker of the mobile device 100.

In some embodiments, mobile device 100 may optionally include a background noise measuring unit 130. Since a background noise such as a traffic noise (bus or car), an engine noise, an air-conditioner noise or a computer keystroke may exist around mobile device 100, voice of the near-end talker may be indistinct due to the background noise. By way of example, but not limitation, background noise measuring unit 130 may collect a background noise inputted to a non-illustrated microphone of mobile device 100 and measure level of the collected background noise. By way of example, but not limitation, background noise measuring unit 130 may measure the background noise level by using one of various SNR (Signal to Noise Ratio) measuring methods. The SNR measuring methods are well known in the art and thus are not described herein.

In some embodiments, mobile device 100 may optionally include a network connectivity measuring unit 140. The network connectivity may be degraded by an environmental problem such as a network delay or latency. This degradation of the network connectivity may decrease the speech quality heard by the near-end talker of mobile device 100. By way of example, but not limitation, network connectivity measuring unit 140 may monitor a current network connectivity of mobile device 100 and measure level of the current network connectivity of mobile device 100.

In some embodiments, when the measured quality of the audio signal is transmitted to another mobile device 200 via an audio channel, mobile device 100 may further include an information inserting unit 150. Information inserting unit 150 may insert the measured quality of the received audio signal into another audio signal which will be transmitted to another mobile device 200. This another audio signal may be voice data or speech data of the near-end talker of mobile device 100. If necessary, information inserting unit 150 may also insert the background noise level measured by background noise measuring unit 130 and/or the network connectivity measured by network connectivity measuring unit 140 into the another audio signal to be transmitted to another mobile device 200.

By way of example, information inserting unit 150 may insert the measured quality of the audio signal (and the background noise level and/or the network connectivity of mobile device 100, if necessary) as watermark into the another audio signal by using one of various audio watermark algorithms. Alternatively, information inserting unit 150 may insert the measured quality of the audio signal (and the background noise level and/or the network connectivity of mobile device 100, if necessary) into an ancillary data field of an audio codec or into an ancillary data field of a transport layer used to send the another audio signal.

Mobile device 100 may further include a transmission unit 160 configured to transmit the quality of the audio signal to another mobile device 200. If the measured quality of the audio signal is inserted into the another audio signal, transmission unit 160 may transmit the another audio signal containing the quality of the audio signal (and the background noise level and/or the network connectivity of mobile device 100, if necessary) via an audio channel for an audio signal. Alternatively, transmission unit 160 may transmit the quality of the audio signal (and the background noise level and/or the network connectivity of mobile device 100, if necessary) via a data channel for data such as, but not limited to, SMS (short message service) data or MMS (multimedia message service) data.

Transmission unit 160 may transmit the quality of the audio signal (and the background noise level and/or the network connectivity of mobile device 100, if necessary) in a predetermined period, for example, in every single frame or in every second. By way of example, if the quality of the audio signal is transmitted in every second and the score of the quality of the audio signal ranges from 1 to 5, the quality of the audio signal can be transmitted with 3 bits per second.

In some embodiments, when the quality of the audio signal is transmitted to mobile device 100 via an audio channel, mobile device 100 may further include an information extracting unit 170 configured to extract the quality of the audio signal (and the background noise level and/or the network connectivity of another mobile device 200, if necessary) from the audio signal. If the quality of the audio signal is inserted into the audio signal as watermark, information extracting unit 170 may extract the inserted quality of the audio signal from the audio signal (and the background noise level and/or the network connectivity of another mobile device 200, if necessary) by using one of various audio watermark algorithms. If the quality of the audio signal is inserted into the ancillary data field of the audio codec or into the ancillary data field of the transport layer, information extracting unit 170 may extract the quality of the audio signal (and the background noise level and/or the network connectivity of another mobile device 200, if necessary) from the ancillary data field of the audio codec or the transport layer.

Figure 3:
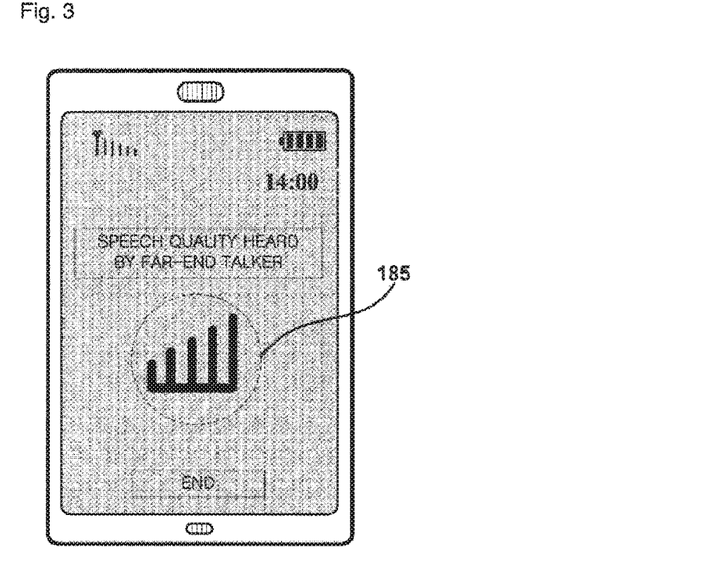
FIG. 3 is an example screen displaying a quality of an audio signal on a mobile device.

Mobile device 100 may further include a display unit 180. Display unit 180 may display the quality of the audio signal received from another mobile device 200 in real time. By way of example, but not limitation, display unit 180 may display the QoS information heard by the far-end talker of another mobile device 200 in graphics such as signal bars, circles, or scores. As shown in FIG. 3, display unit 180 may display the speech quality heard by the far-end talker of another mobile device 200 in signal bars 185. Here, the number of the signal bars 185 may indicate the magnitude of the measured quality of the audio signal.

Although the present embodiment has been described for the case of including individual receiving unit 110 and transmission unit 160, mobile device 100 may include a single transceiver configured to transmit an audio signal to another mobile device 200 and receive an another audio signal from another mobile device 200.

In accordance with the present embodiment, mobile device 100 can receive the measured speech quality from another mobile device 200 and display the measured speech quality in real time. Therefore, the near-end talker of mobile device 100 can check the speech quality which is heard by the far-end talker of another mobile device 200, and the near-end talker of mobile device 100 can move to better places such as places with less noise, less fading, or can stop the car.

Figure 4:
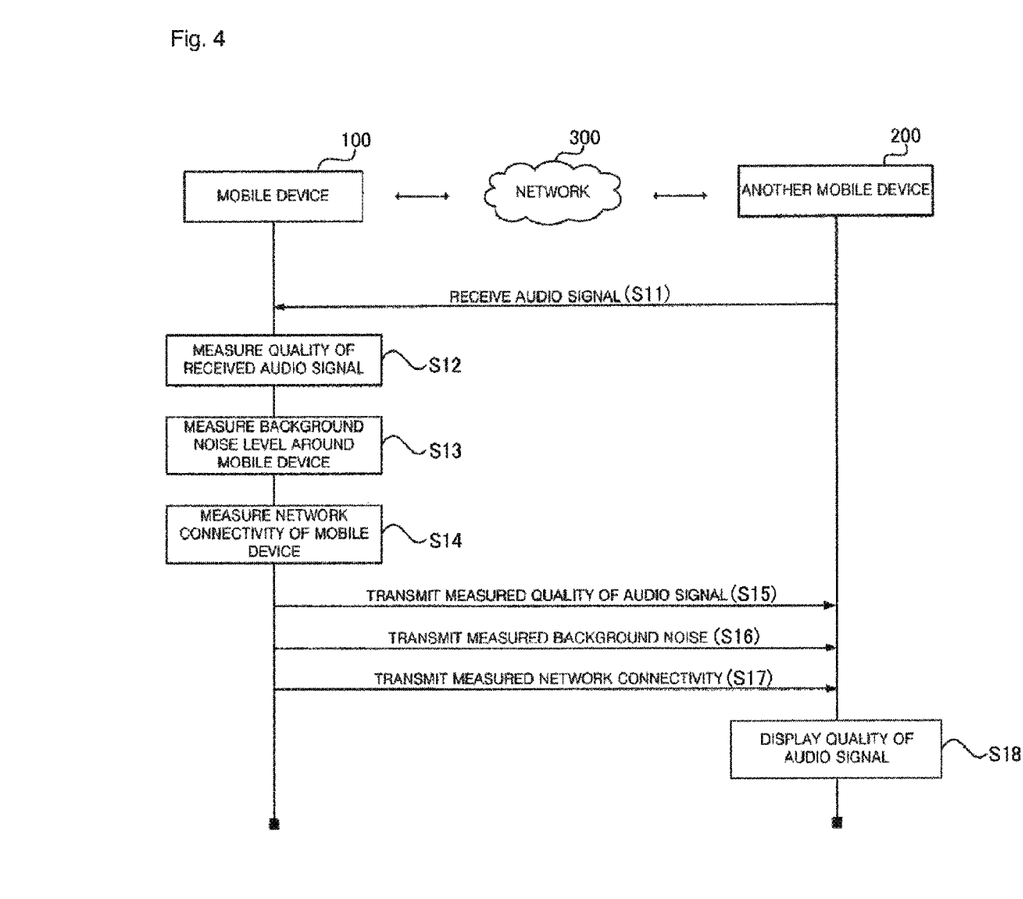
FIG. 4 is an example flow diagram of a method for measuring a quality of an audio signal.

FIG. 4 shows an example flow diagram of a method for measuring a quality of an audio signal in accordance with at least some embodiments described herein. The method in FIG. 4 could be implemented using mobile device 100 including receiving unit 110, audio quality measuring unit 120, background noise measuring unit 130, network connectivity measuring unit 140 and transmission unit 160 and another mobile device 200 including receiving unit 110, transmission unit 160 and display unit 180 discussed above. An example method may include one or more operations, actions, or functions as illustrated by one or more of blocks S11, S12, S13, S14, S15, S16, S17 and/or S18. Although illustrated as discrete blocks, various blocks may be divided into additional blocks, combined into fewer blocks, or eliminated, depending on the desired implementation. Hereinafter, there will be explained a case of measuring a quality of an audio signal of another mobile device 200 by mobile device 100.

When a call is connected between mobile device 100 and another mobile device 200, mobile device 100 may receive an audio signal such as speech data of a far-end talker from another mobile device 200 (block S11). At block S12, mobile device 100 may measure a quality of the audio signal without using a reference audio signal. By way of example, but not limitation, mobile device 100 may measure the quality of the audio signal by using an ANIQUE (Auditory Non-Intrusive Quality Estimation) algorithm.

At block S13, the mobile device 100 may measure a background noise level around mobile device 100. By way of example, but not limitation, mobile device 100 may measure level of the background noise inputted to a non-illustrated microphone of mobile device 100, as additional information of the quality of the audio signal. That is, mobile device 100 may collect a background noise inputted to the microphone of mobile device 100 and measure level of the collected background noise by using any one of various SNR (Signal to Noise Ratio) measuring methods.

At block S14, mobile device 100 may measure the network connectivity of mobile device 100 as additional information of the quality of the audio signal. By way of example, but not limitation, mobile device 100 may monitor a current network connectivity of mobile device 100 and measure level of the current network connectivity of mobile device 100.

At block S15, mobile device 100 may transmit the measured quality of the audio signal to another mobile device 200. By way of example, but not limitation, mobile device 100 may transmit, to another mobile device 200, the quality of the audio signal via an audio channel or via a data channel. By way of example, but not limitation, if the quality of the audio signal is inserted into the another audio signal, mobile device 100 may transmit the another audio signal containing the quality of the audio signal to another mobile device 200. Alternatively, mobile device 100 may transmit the quality of the audio signal via a data channel for data such as, but not limited to, SMS (short message service) data or MMS (multimedia message service) data. By way of example, but not limitation, mobile device 100 may transmit the quality of the audio signal in a predetermined period, for example, in every single frame or in every second.

At block S16, mobile device 100 may transmit the measured background noise level to another mobile device 200, if necessary. At block S17, mobile device 100 may transmit the measured network connectivity of mobile device 100 to another mobile device 200, if necessary.

At blocks S15 to S17, although it is described that mobile device 100 transmits, to another mobile device 200, the quality of the measured audio signal, the measured background noise level and the measured network connectivity, at different times. However, the present disclosure may not be limited thereto and mobile device 100 may transmit, to another mobile device 200, the quality of the measured audio signal, the measured background noise level and the measured network connectivity at the same time. Further, mobile device 100 may transmit, to another mobile device 200, at least one of the quality of the measured audio signal, the measured background noise level and the measured network connectivity.

If the quality of the audio signal is received by another mobile device 200, another mobile device 200 may display the received quality of the audio signal (block S18). By way of example, but not limitation, if another mobile device 200 may receive the quality of the audio signal inserted into the another audio signal via the audio channel, another mobile device 200 may extract the quality of the audio signal from the another audio signal. By way of example, but not limitation, if the quality of the audio signal is inserted into the another audio signal as watermark, anther mobile device 200 may extract the inserted quality of the audio signal from the another audio signal by using any one of various audio watermark algorithms. By way of example, but not limitation, if the quality of the audio signal is inserted into the ancillary data field of the audio codec or into the ancillary data field of the transport layer, another mobile device 200 may extract the quality of the audio signal from the ancillary data field of the audio codec or the transport layer.

Further, at block S18, another mobile device 200 may also display the background noise level and/or the network connectivity, if necessary. By way of example, but not limitation, another mobile device 200 may display QoS information heard by the near-end talker of mobile device 100 in graphics such as signal bars, circles or scores.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A mobile device, comprising:
   a receiver unit configured to receive an audio signal transmitted from another mobile device;
   an audio quality measurement unit configured to measure a quality of the received audio signal by use of an auditory non-intrusive quality estimation (ANIQUE) algorithm;
   a background noise measurement unit configured to measure a background noise level around the mobile device;
   a network connectivity measurement unit configured to measure a network connectivity of the mobile device; and
   a transmission unit configured to transmit the measured quality of the audio signal, the measured background noise level, and the measured network connectivity to the another mobile device.

2. The mobile device of claim 1, further comprising:
   an information insertion unit configured to insert the measured quality of the audio signal into another audio signal,
   wherein the transmission unit is further configured to transmit the another audio signal to the another mobile device via an audio channel.

3. The mobile device of claim 2, wherein the information insertion unit is further configured to insert the measured background noise level and/or the measured network connectivity into the another audio signal.

4. The mobile device of claim 2, wherein the information insertion unit is further configured to use an audio watermark algorithm to insert the measured quality of the audio signal as a watermark into the another audio signal.

5. The mobile device of claim 2, wherein the information insertion unit is further configured to insert the measured quality of the audio signal into an ancillary data field of an audio codec used to encode the another audio signal.

6. The mobile device of claim 2, wherein the information insertion unit is further configured to insert the measured quality of the audio signal into an ancillary data field of a transport layer used to send the another audio signal.

7. The mobile device of claim 1, wherein the transmission unit is configured to transmit the measured quality of the audio signal, the measured background noise level, or the measured network connectivity to the another mobile device via a data channel that includes short message service (SMS) data or multimedia message service (MMS) data.

8. The mobile device of claim 1, wherein the background noise measurement unit comprises a microphone of the mobile device.

9. A method, comprising:
   transmitting, by a mobile device, an audio signal to another device;
   receiving, by the mobile device, from the another device, a quality of the transmitted audio signal measured on the another device by use of an auditory non-intrusive quality estimation (ANIQUE) algorithm;
   receiving, by the mobile device, from the another device, a background noise level around the another device;
   receiving, by the mobile device, from the another device, a network connectivity of the another device; and
   displaying, by the mobile device, the received quality of the transmitted audio signal, the received background noise level around the another device, and the received network connectivity of the another device.

10. The method of claim 9, wherein the quality of the transmitted audio signal is received via another audio signal from the another device, and the method further comprises extracting the quality of the transmitted audio signal from the another audio signal.

11. The method of claim 10, wherein the extracting the quality of the transmitted audio signal from the another audio signal is based on an audio watermark algorithm.

12. The method of claim 9, wherein the background noise level and the network connectivity of the another device are received via another audio signal from the another device, and the method further comprises extracting the background noise level and the network connectivity of the another device from the another audio signal.

13. The method of claim 9, wherein the quality of the transmitted audio signal is represented by quality of service (QoS) information using 3 bits per second or less.

14. The method of claim 13, wherein the displaying includes displaying the QoS information in graphics that include signal bars, circles, or scores.

15. The method of claim 14, wherein a number of the signal bars indicates a magnitude of the received quality of the transmitted audio signal.

16. The method of claim 9, wherein the displaying is performed in real time.

17. A non-transitory computer-readable storage medium having stored therein executable instructions that, in response to execution by at least one processor on a mobile device, cause the at least one processor to perform or control performance of operations to:
   transmit a first audio signal to another mobile device;
   receive, from the another mobile device, a quality of the first audio signal transmitted to and received by the another mobile device;
   display the received quality of the first audio signal;
   receive a second audio signal from the another mobile device;
   measure a quality of the second audio signal by use of an auditory non-intrusive quality estimation (ANTIQUE) algorithm;
   transmit the measured quality of the second audio signal to the another mobile device;
   measure a background noise level around the mobile device;
   transmit the measured background noise level to the another mobile device;
   measure a network connectivity of the mobile device; and
   transmit the measured network connectivity of the mobile device to the another mobile device.

18. The non-transitory computer-readable storage medium of claim 17, wherein the reception of the quality of the first audio signal includes reception of a third audio signal that includes the quality of the first audio signal from the another mobile device, and wherein the operations further comprise extraction of the quality of the first audio signal from the received third audio signal.

19. The non-transitory computer-readable storage medium of claim 17, wherein the operations further comprise reception, from the another mobile device, of a background noise level around the another mobile device and a network connectivity of the another mobile device.

20. The non-transitory computer-readable storage medium of claim 17, wherein the operations further comprise display of the quality of the first audio signal in graphics that include signal bars, circles, or scores.

\* \* \* \* \*

UNITED STATES PATENT AND TRADEMARK OFFICE
CERTIFICATE OF CORRECTION

PATENT NO.         : 9,729,602 B2
APPLICATION NO.    : 15/019408
DATED              : August 8, 2017
INVENTOR(S)        : Chang Page 1 of 1

It is certified that error appears in the above-identified patent and that said Letters Patent is hereby corrected as shown below:

In Column 12, Line 45, in Claim 17, delete "(ANTIQUE)" and insert -- (ANIQUE) --, therefor.

Signed and Sealed this
Seventeenth Day of April, 2018

Andrei Iancu
*Director of the United States Patent and Trademark Office*